3,514,515
METHOD OF CONTROLLING CORNS AND CALLOUSES
William H. Woolf, 1617 S. 28th St.,
Arlington, Va. 22206
No Drawing. Filed May 5, 1967, Ser. No. 636,263
Int. Cl. A61k 27/00; A01n 9/24
U.S. Cl. 424—317                    4 Claims

ABSTRACT OF THE DISCLOSURE

A preparation containing a salt of thioglycolic acid, as the active ingredient, along with an inert vehicle for arresting and eliminating corns and callouses from parts of the human body.

BACKGROUND OF THE INVENTION

Corns and callouses have long pained the patient and puzzled the medical practitioner. Irritations from these lesions are evident in the form of a circumscribed thickening of the epidermis occurring usually when the skin surface is subjected to friction and pressure. With respect to the plantar corn or callous, there may be an orthopedic involvement and, in the case of small miliary (seed-like) corns dry skin may be adjudged a causative factor.

In the past, various forms of therapy have been employed in the treatment of this common podiatric condition and they include the use of orthopedic appliances, medications and surgical procedures. Such techniques have met thus far with only limited success.

It can reasonably be stated that probably no other foot problems have been responsible for more "patient wandering" from one foot specialist to another than these vexatious excrescences.

Salicyclic acid has long been the predominant active ingredient in medications marketed for the treatment of these painful foot excrescences. The virtue of this popular exfoliative agent and other exfoliating agents depends upon the peeling off of the outer epithelial layers of the skin by chemically strong acid ingredients. Acid burning from the careless or too frequent application of these concoctions may cause severe irritation to, and even ulceration of the surrounding healthy tissues.

SUMMARY OF THE INVENTION

This invention relates to a preparation for controlling and eliminating callouses and corns, and comprises the combination of an inert vehicle and a salt of thioglycolic acid. Additionally, the preparation may contain a suitable adjuvant such as propylene glycol, ethyl alcohol, glycerine or water.

This new preparation has been found unexpectedly to eliminate the offending lesions, thereby restoring the normal lines and the natural texture of the skin.

Also, this medication has been found advantageously to effect an accompanying softening of the hard callous or corn tissues. The irritated tissues are thus maintained in a soft and resilient state over a period of time by this novel preparation, thereby lessening the irritating impact of any bony prominence that may act against the involved tissues and allowing conventional, as opposed to orthopedic, shoes to be worn in comfort. Thus, even while the treatment is being performed, this novel preparation relieves the painful symptoms of the corn and callous and allows the patient freedom from painful symptoms even before the corn or callous tissues actually disappear.

DESCRIPTION OF THE PREFERRED EMBODIMENTS

Illustrative of the compositions of the invention suitable for corns and callouses, the following are given in percentages by weight:

Example 1
|  | Gm. |
|---|---|
| Sodium thiogycolate | 30(6%) |
| Propylene glycol | 40 |
| Water soluble ointment base | 215 |
| Hydrophilic ointment | 215 |

Example 2
|  | Gm. |
|---|---|
| Sodium thioglycolate | 30(6%) |
| Propylene glycol | 40 |
| Water soluble ointment base | 430 |

Example 3
|  | Gm. |
|---|---|
| Sodium thioglycolate | 1.5(6%) |
| Water soluble ointment base | 23.5 |

Example 4
|  | Gm. |
|---|---|
| Sodium thioglycolate | 1.5(6%) |
| Glycerine | 2.0 |
| Water soluble ointment base | 21.5 |

Example 5
|  | Gm. |
|---|---|
| Sodium thioglycolate | 3.0(3%) |
| Water soluble ointment base | 97.0 |

Example 6
|  | Gm. |
|---|---|
| Sodium thioglycolate | 4.0(23.5%) |
| Propylene glycol | 3.0 |
| Water soluble ointment base | 10.0 |

Example 7
|  | Gm. |
|---|---|
| Calcium thioglycolate | 1.0(10%) |
| Water soluble ointment base | 9.0 |

Example 8
|  | Gm. |
|---|---|
| Calcium thioglycolate | 2.0 (40%) |
| Water soluble ointment base | 3.0 |

Example 9
|  | Gm. |
|---|---|
| Sodium thioglycolate | 1.5(6%) |
| Propylene glycol | 2.0 |
| Petrolatum | 21.5 |

Example 10
|  | Gm. |
|---|---|
| Sodium thioglycolate | 1.5(6%) |
| Ethyl alcohol | 3.0 |
| Water soluble ointment base | 20.5 |

Example 11
|  | Gm. |
|---|---|
| Ammonium thioglycolate (60% aqueous solution) | 15(30%) |
| Water soluble ointment base | 7.5 |
| Hydrophilic ointment base | 7.5 |

Example 12

| | Gm. |
|---|---|
| Ammonium thioglycolate (60% aqueous solution) | 3.0 (6%) |
| Water soluble ointment base | 13.5 |
| Hydrophilic ointment base | 13.5 |

Example 13

| | Gm. |
|---|---|
| Ammonium thioglycolate (60% aqueous solution) | 5.0 (10%) |
| Water soluble ointment base | 12.5 |
| Hydrophilic ointment base | 12.5 |

Example 14

| | Gm. |
|---|---|
| Ammonium thioglycolate (60% aqueous solution) | 10 (20%) |
| Hydrophilic ointment base | 20 |

Example 15

| | Gm. |
|---|---|
| Ammonium thioglycolate (60% aqueous solution) | 5.0 (10%) |
| Hydrophilic ointment base | 25.0 |

Example 16

| | Gm. |
|---|---|
| Ammonium thioglycolate (60% aqueous solution) | 17.5 (35%) |
| Hydrophilic ointment base | 12.5 |

Example 17

| | Gm. |
|---|---|
| Calcium thioglycolate | 4 (20%) |
| Water soluble ointment base | 8 |
| Hydrophilic ointment base | 8 |

Example 18

| | Gm. |
|---|---|
| Calcium thioglycolate | 6 (30%) |
| Water soluble ointment base | 14 |

Example 19

| | Gm. |
|---|---|
| Sodium thioglycolate | 1.5 (6%) |
| Water | 1.5 |
| Water soluble ointment base | 22 |

Example 20

| | Gm. |
|---|---|
| Sodium thioglycolate | 9 (60%) |
| Propylene glycol | 6 |

Example 21

| | Gm. |
|---|---|
| Sodium thioglycolate | 9 (45%) |
| Liquid Petrolatum | 11 |

Example 22

| | Gm. |
|---|---|
| Sodium thioglycolate | 11 (50%) |
| Castor oil | 11 |

Example 23

| | Gm. |
|---|---|
| Sodium thioglycolate | 9.0 (69%) |
| Castor oil | 4.0 |

In the above examples, the sodium, calcium and ammonium thioglycolates are the active ingredients, while the propylene glycol, ethyl alcohol, glycerine and water may be utilized as adjuvants to assist in bringing the active ingredients within the inert vehicle. Other adjuvants may be equivalently found suitable and thereby contemplated in this invention as long as they perform the above function and do not interfere with the function of the active ingredients.

The particular types of inert vehicles used in this invention are not critical; however, they should be of such a type as to add bulk to the formulation without interfering with the active ingredients. In other words, the vehicles should comprise an inert substance and confer a suitable consistency to the resulting preparation to facilitate its application.

Suitable inert vehicles would include ointment bases such as: (1) a polyethylene-glycol ointment base; (2) Unibase which contains higher fatty alcohols, petrolatum, glycerine, water and an emulsifying agent in such proportions that the incorporation of both water soluble and water insoluble drugs is accomplished with ease; (3) Velvachol which contains cholesterin, sodium lauryl sulfate, cetyl alcohol, stearyl alcohol, petrolatum, mineral oil and distilled water; (4) a hydrophilic ointment base which contains methylparaben, propylparaben, sodium lauryl sulfate, propylene glycol, stearyl alcohol, white petrolatum and purified water; and (5) petrolatum. Other typical inert vehicles, which have been found useful, are propylene glycol and castor oil. Accordingly, it can be understood that this invention contemplates the incorporation of the active ingredients into any inert medium which would facilitate the application of the active ingredients to the human body.

While the above Examples demonstrate the wide percentage range of active ingredients that is contemplated in this invention, the preferred weight percent range is between about 3% and 69% based upon the total weight of the preparation. These percentages are illustrative only and should not be construed as absolute limits.

The procedure for treating a patient having corns or callouses with the novel preparation may be as follows.

In the accepted manner, the podiatrist pares off with a scalpel any overlying callous that may be present and enucleates the deep corn, preferably without hemorrhaging. Employing the wood end of a standard cotton-tipped applicator, or using a toothpick, a little dab of the preparation is applied directly to the small circumscribed area of the enucleated corn. The application is then covered tightly with an adhesive cover. It can readily be appreciated that spreading or smearing the preparation beyond the small area of the enucleated corn will prevent firm adherence of the adhesive.

The patient is instructed to leave the dessing undisturbed until the adhesive cover comes off, or loosens or shifts. Whether this develops after 10 days, three days or only one day, the patient should re-apply the preparation himself, with a toothpick or wooden applicator and again cover with an adhesive cover. The important instruction to the patient is to keep the enucleated corn area continuously covered with the preparation and adhesive cover between scheduled office visits.

The patient is rescheduled to return to the podiatrist's office usually in three weeks, at which time the treatment rendered previously is repeated. The podiatrist again pares off and enucleates the excrescence. He re-applies the preparation and the adhesive cover. The patient is again scheduled for a return office visit in three weeks for the same treatment. Between office visits, whenever the dressing loosens, shifts or comes off, the patient himself should re-apply the preparation and the adhesive cover. The enucleated corn area should be kept covered continuously with the preparation and the adhesive cover.

The following familiar signs usually will be observed in the treatment of corns and callouses by this novel preparation. Firstly, pain will lessen, even though the corn may gradually reappear after the preparation is applied. Then, as treatments continue, the corn will gradually become more shallow. The surrounding callous, if present, will usually lessen considerably. Following continued re-application of the preparation and repeated office treatments, the deep corn will disappear, leaving only a tiny, pin-head size translucent "spot" or "shadow." Eventually, it may even become difficult to locate the "spot" in order to re-apply the preparation. However, it is best that that treatment should be continued until even the tiny translucent "spot" or "shadow" of the original corn nucleus disappears. Finally, even after both subjective and objective symptoms have gone, it is wise to have the patient apply a small plain adhesive cover, without the preparation, for several weeks more.

I claim:
1. The method of controlling and eliminating callouses and corns which comprises applying to the callous or corn a salt of thioglycolic acid selected from the group consisting of sodium, calcium and ammonium thioglycolate, in an inert vehicle which facilitates the application of the salt to the human body, said salt being present in the amount of at least about 3 percent by weight.

2. The method of claim 1 in which the amount of thioglycolic salt is about 6 percent by weight.

3. The method of claim 1 in which the amount of the thioglycolic salt is about 3 percent to 69 percent by weight.

4. The method of claim 3 in which the salt is the sodium salt.

References Cited
UNITED STATES PATENTS

| | | | |
|---|---|---|---|
| 2,823,168 | 2/1958 | Stonehill | 8—161 |
| 3,154,470 | 10/1964 | Braun et al. | 8—161 |
| 3,194,736 | 7/1965 | Braun et al. | 8—161 |

OTHER REFERENCES
Dermatological Formulary, 1957, pp. 40–42.

ALBERT T. MEYERS, Primary Examiner

D. R. ORE, Assistant Examiner